US010459180B2

(12) United States Patent
Yang et al.

(10) Patent No.: US 10,459,180 B2
(45) Date of Patent: *Oct. 29, 2019

(54) OPTICAL MODULE

(71) Applicants: HISENSE BROADBAND MULTIMEDIA TECHNOLOGIES CO., LTD., Qingdao (CN); HISENSE BROADBAND MULTIMEDIA TECHNOLOGIES, LTD., Road Town (VG)

(72) Inventors: Sigeng Yang, Qingdao (CN); Yinlong Liu, Qingdao (CN); Yongliang Huang, Qingdao (CN); Shijian Ben, Qingdao (CN); Jingsheng Xia, Qingdao (CN); Peng He, Qingdao (CN); Haiqiang Xu, Qingdao (CN); Shengwei Bo, Qingdao (CN); Tengyue Li, Qingdao (CN)

(73) Assignees: HISENSE BROADBAND MULTIMEDIA TECHNOLOGIES CO., LTD., Shandong (CN); HISENSE BROADBAND MULTIMEDIA TECHNOLOGIES, LTD., Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 15/961,841

(22) Filed: Apr. 24, 2018

(65) Prior Publication Data

US 2018/0314018 A1 Nov. 1, 2018

Related U.S. Application Data

(63) Continuation of application No. 15/395,939, filed on Dec. 30, 2016, now Pat. No. 9,983,373.

(30) Foreign Application Priority Data

Jun. 15, 2016 (CN) .......................... 2016 1 0416855
Jun. 15, 2016 (CN) .......................... 2016 1 0435782

(51) Int. Cl.
*H04B 10/25* (2013.01)
*G02B 6/42* (2006.01)
(Continued)

(52) U.S. Cl.
CPC ............. *G02B 6/4286* (2013.01); *G02B 6/32* (2013.01); *G02B 6/3825* (2013.01);
(Continued)

(58) Field of Classification Search
CPC ...... G02B 6/4286; G02B 6/3881; G02B 6/32; G02B 6/4246; G02B 6/428; G02B 6/4293;
(Continued)

(56) References Cited

U.S. PATENT DOCUMENTS 6,632,023 B1* 10/2003 Ogawa ................. G02B 6/3825
385/53
2003/0002810 A1 1/2003 Cheng ............................ 385/76
(Continued)

FOREIGN PATENT DOCUMENTS

CN 201576116 U 9/2010
CN 103091796 A 5/2013
(Continued)

OTHER PUBLICATIONS

The European Examination Report of corresponding European patent application No. 16 207 480.1-1001, dated Sep. 27, 2018.
(Continued)

*Primary Examiner* — Don N Vo
(74) *Attorney, Agent, or Firm* — J.C. Patents

(57) ABSTRACT

The disclosure provides an optical module, including a housing, a circuit board and a light conducting structure; a portion of the light conducting structure is disposed in the housing, another portion of the light conducting structure juts out from the housing; the circuit board is provided with
(Continued)

a light source, and the light conducting structure is configured to conduct light emitted by the light source to an outside of the housing. The optical conducting module in the optical module can conduct light emitted from the optical module to outside of the optical module. The optical module allows the state inside the optical module to be conducted to and displayed in the outside of the optical module with optical signals as propagation medium. The state inside the optical module can be directly learned from the outside of the optical module housing, thereby extending application scenarios of the optical module.

20 Claims, 10 Drawing Sheets

(51) Int. Cl.
  *G02B 6/32* (2006.01)
  *G02B 6/38* (2006.01)
  *H04B 10/07* (2013.01)
  *H04B 10/50* (2013.01)
  *H04B 10/40* (2013.01)
(52) U.S. Cl.
  CPC ........... *G02B 6/3881* (2013.01); *G02B 6/428* (2013.01); *G02B 6/4246* (2013.01); *G02B 6/4249* (2013.01); *G02B 6/4284* (2013.01); *G02B 6/4293* (2013.01); *H04B 10/07* (2013.01); *H04B 10/50* (2013.01); *H04B 10/40* (2013.01)

(58) Field of Classification Search
  CPC .. G02B 6/4284; G02B 6/3825; G02B 6/4249; H04B 10/50; H04B 10/07; H04B 10/40
  USPC ............................................................. 398/9
  See application file for complete search history.

(56) References Cited

U.S. PATENT DOCUMENTS

| | | | |
|---|---|---|---|
| 2005/0141827 A1* | 6/2005 | Yamada | G02B 6/4201 385/92 |
| 2010/0054749 A1 | 3/2010 | Hosking | 398/135 |
| 2013/0230278 A1* | 9/2013 | Hung | G02B 6/12 385/14 |
| 2014/0035755 A1 | 2/2014 | Ward et al. | 340/691.1 |
| 2015/0003839 A1 | 1/2015 | Minota | 398/138 |
| 2015/0103336 A1 | 4/2015 | Rolston et al. | |
| 2015/0331208 A1 | 11/2015 | Moriyama et al. | |

FOREIGN PATENT DOCUMENTS

| | | |
|---|---|---|
| CN | 105652392 A | 6/2016 |
| JP | 2013-156376 A | 8/2013 |

OTHER PUBLICATIONS

The Chinese First Examination Report of corresponding Chinese patent application No. 201610416855.1, dated Nov. 28, 2017.

* cited by examiner

OPTICAL MODULE

CROSS-REFERENCE TO RELATED APPLICATIONS

This application is a continuation of U.S. application Ser. No. 15/395,939 filed on Dec. 30, 2016, and entitled "Optical Module", which claims priority to Chinese Patent Application No. 201610435782.0, entitled "Optical Module", filed on Jun. 15, 2016 to the Chinese Patent Office, and the priority to Chinese Patent Application No. 201610416855.1, entitled "Optical Module", filed on Jun. 15, 2016 to the Chinese Patent Office. The disclosures of the aforementioned applications are hereby incorporated by reference in their entireties.

TECHNICAL FIELD

Embodiments of the present disclosure relate to the field of communication technologies and, in particular, to an optical module.

BACKGROUND

An optical module, which is an important part in optical communication networking, realizes the mutual conversion between an optical signal and an electrical signal. With the rapid development of Internet business, the vast data centers and cloud devices are built globally. Several or even dozens of optical modules need to be applied on each device, thus it will cost enormous human and material resources during the system building and debugging process at an earlier stage. It is impossible to determine from the actual optical module whether or not an installed device and optical module are working properly, thus the professional monitoring equipment and monitoring program are necessarily required and used to read the working state information of each optical module, while the monitoring equipment is generally placed in the optical module monitoring area far away from the optical module working area.

When performing abnormality detection of an optical module, the working state information of the optical module monitored in the optical module monitoring area should be generally obtained first, and then the detection and confirmation should be performed in the working area where each optical module locates, such that the abnormal optical modules and the specific abnormal parts can be detected one by one. The entire detection process needs multiple roundtrips between the optical module working area and the optical module monitoring area, resulting in an extremely low detection efficiency of the abnormal optical module.

In summary, due to the closure of the optical module housing, there is a technical problem of low efficiency in positioning abnormal optical modules during the maintenance of the optical module.

SUMMARY

Embodiments of the present disclosure provide an optical module for solving the technical problem of low efficiency in positioning abnormal optical modules during the maintenance of optical modules due to the closure of the optical module housing.

An embodiment of the present disclosure provides an optical module, including: a housing, a circuit board, and a light conducting structure; a portion of the light conducting structure is disposed within the housing, and another portion of the light conducting structure juts out from the housing; the circuit board is provided with a light source, and the light conducting structure is configured to conduct light emitted from the light source to an outside of the housing.

The light conducting structure in the above-mentioned optical module can conduct the light emitted from the inside of the optical module to the outside of the optical module. The optical module of the present disclosure may allow some conditions inside the optical module to be conducted to and displayed in the outside of the optical module with optical signals as propagation medium. Thus, some conditions inside the optical module can be directly learned from the outside of the optical module housing, thereby extending the application scenarios of the optical module. For example, when the maintenance of the optical module is required, the maintainer only needs to learn some conditions of the optical module by controlling the light source inside the optical module to transmit an optical signal indicating some conditions of the optical module. The optical signal transmitted from the light source is conducted to the outside of the optical module housing through the light conducting structure of the optical module, so that the maintainer can intuitively learn some conditions inside the optical module and further position an abnormal optical module according to some conditions inside the optical module. The maintainer does not have to make multiple roundtrips between the optical module working area and the optical module monitoring area for positioning the abnormal optical module. Therefore, the structure of the optical module in the present disclosure can improve the efficiency of the maintainer in positioning the anomaly optical module.

BRIEF DESCRIPTION OF THE DRAWINGS

The accompanying drawings, which provide a further understanding of the disclosure and form a part of the specification, also serve together with embodiments of the disclosure to explain the present disclosure and are not to be construed as the limitations of the present disclosure. In the drawings.

DESCRIPTION OF EMBODIMENT

In order to render a clearer description of the purposes, technical solutions and advantages of embodiments of the present disclosure, the technical solutions in the embodiments of the present disclosure will be described clearly and comprehensively as follows in combination with drawings accompanying the embodiments of the present disclosure. And apparently, the described embodiments are just part rather than all of the embodiments of the present disclosure. All the other embodiments acquired by one with ordinary skill in the art based on the embodiments of the present disclosure without delivering creative efforts shall fall into the protection scope of the present disclosure.

Figure 17:
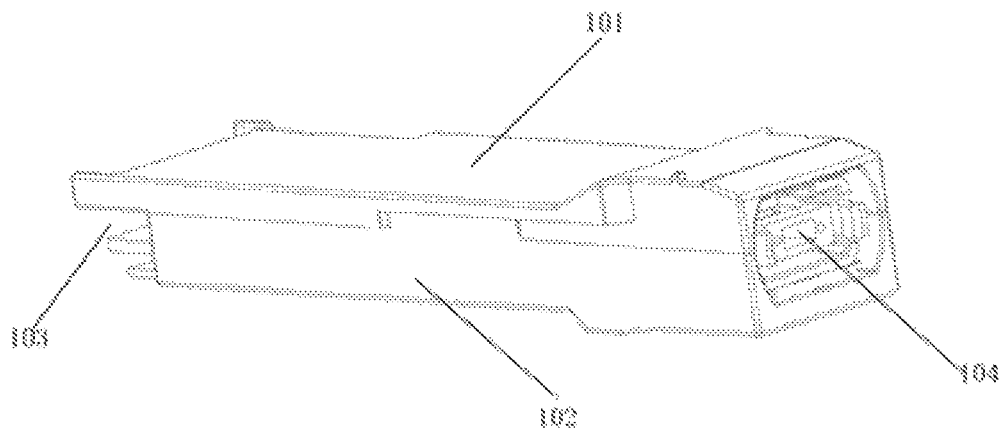
FIG. 17 is a schematic structural view of a conventional optical module.

FIG. 17 is a schematic structural view of a conventional optical module. As shown in FIG. 17, an optical module includes an upper housing 101 and a lower housing 102.

The upper housing 101 and the lower housing 102 of the optical module form an open cavity that encloses internal parts of the optical module. The cavity is used not only to enclose and protect the internal parts of the optical module, but also to form electromagnetic isolation. One end of the cavity is an electrical interface 103 of the optical module and the other end of the cavity is an optical interface 104 of the optical module.

The lower housing 102 of the optical module is a U-shaped groove. The upper housing 101 of the optical module is a cover plate, and the upper housing and the lower housing form the cavity with both ends opened.

The optical interface of the optical module is an optical transmission interface between the optical module and an optical fiber. In order to realize the optical connection of the optical fiber and the optical interface, a standard optical fiber adapter is used to connect the optical module and the optical fiber in the industry. One end of the optical fiber adapter is connected to the external optical fiber and the other end is inserted into the optical interface of the optical module. The optical fiber adapter generally used in the related art is stuffed into the optical interface of the optical module.

At present, both the package dimension of the optical module and the design of the optical interface in the optical module have specific industrial standards, especially the optical interface of the optical module, which is connected to the external optical fiber through a standard optical fiber adapter. The area and dimension of the standard optical fiber adapter matches with those of the optical interface of the optical module. The optical fiber adapter can be connected to the optical fiber and also can be inserted into the optical interface of the optical module, thereby realizing the connection between the optical module and the external optical fiber.

In order to solve the technical problem of low efficiency in positioning abnormal optical modules during the maintenance of the optical modules due to the closure of the optical module housing, an embodiment of the present disclosure provides an optical module. The optical module may include a light emitting component, a light receiving component and a controller etc., where the light emitting component can convert an electrical signal outputted by the controller into an optical signal which transmits in an optical fiber, and the light receiving component can convert the optical signal from the optical fiber into the electrical signal which is then transmitted to the controller. According to an embodiment of the present disclosure, an optical module may further include a light conducting structure, a housing and a circuit board. A portion of the light conducting structure is disposed within the housing, and another portion of the light conducting structure juts out from the housing; the circuit board is provided with a light source, and the light conducting structure is configured to conduct light emitted from the light source to the outside of the housing. The light conducting structure in the optical module can conduct the light emitted from the inside of the optical module to the outside of the optical module. The optical module of the present disclosure may allow some conditions inside the optical module to be conducted to and displayed in the outside of the optical module with optical signals as propagation medium. Thus, some conditions inside the optical module can be directly learned from the outside of the optical module housing, thereby extending the application scenarios of the optical module. For example, when the maintenance of the optical module is required, the maintainer only needs to learn some conditions of the optical module by controlling the light source inside the optical module to transmit an optical signal indicating some conditions of the optical module. The optical signal transmitted from the light source is conducted to the outside of the optical module through the light conducting structure of the optical module, so that the maintainer can intuitively learn some conditions inside the optical module and further position an abnormal optical module according to some conditions inside the optical module. The maintainer does not have to make multiple roundtrips between the optical module working area and the optical module monitoring area for positioning the abnormal optical module. Therefore, the structure of the optical module in the present disclosure can improve the efficiency of the maintainer in positioning the anomaly optical module.

In order to make the technical problems, technical solutions and beneficial effects of the present disclosure more clear, the preferred embodiments of the present disclosure will be described below with reference to the accompanying drawings. It should be understood that the preferred embodiments described herein are only for the purpose of illustration and explanation rather than the limitation of the present disclosure. And the features in the embodiments as well as the embodiments of the present application may be combined with each other without colliding.

In order to follow the industrial standard, the improved optical module in the embodiments of the present disclosure still adopts the standard optical fiber adapter, ensuring the improved optical module to be compatible with the external optical fiber connection mode adopted in the former optical module.

Figure 1:
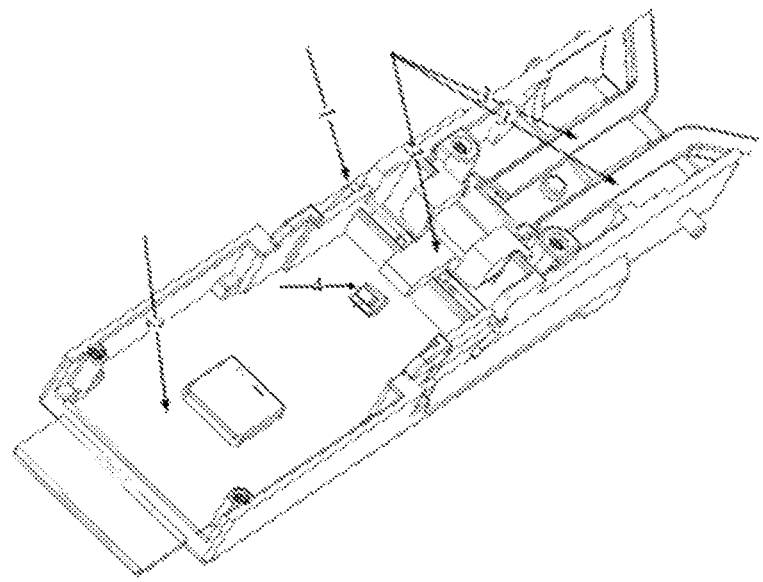
FIG. 1 to FIG. 14 are schematic structural views of an optical module provided by embodiments of the present disclosure.

As shown in FIG. 1, the structure of an optical module provided by an embodiment of the present disclosure may include: a housing 1, a circuit board 2 and a light conducting structure 3. A portion of the light conducting structure 3 is disposed within the housing 1, and another portion of the light conducting structure 3 juts out from the housing 1; the circuit board 2 is provided with a light source 4, and the light conducting structure 3 is configured to conduct the light emitted from the light source 4 to the outside of the housing 1.

The housing 1 in the optical module refers to a lower housing of the optical module, and the circuit board 2 is mounted on the lower housing. According to the embodiments of the present disclosure, the optical module may further include an upper housing.

The light source 4 in the above-mentioned optical module will be described as below: the position of the light source 4 on the circuit board 2 is not particularly limited in the embodiments of the present disclosure, which is to say, the light source 4 may be disposed at the edge or in the center of the circuit board 2. Preferably, in order to realize a better conduction effect when the light conducting structure 3 conducts the light emitted from the light source 4, the light source 4 is disposed at the edge on the side of the circuit board 2 near the light conducting structure 3, thereby allowing the light conducting structure 3 to receive greater light energy. The light source 4 may be an indicator light, such as an LED, which may emit light of different colors, and may emit light of different frequencies, such as light flashed once every second. The light source 4 may be controlled by the controller to emit the light indicating some conditions inside the optical module according to a control signal once receiving such a control signal from the controller.

In the optical module described above, the light conducting structure 3 is designed to be a light conducting component with a portion locked with the bottom of the housing 1 and another portion extending from the inside of the housing 1 to the outside of the housing 1. The light conducting structure 3 may either receive the optical signal emitted by the light source or conduct the optical signal to the outside of housing 1. In the preferred embodiment, the structure on the light conducting structure 3 located outside the housing 1 may display an optical signal. In order to realize the above functions of the light conducting structure 3, the light conducting structure 3 is an integrally-formed transparent light conducting component. When the light source 4 inside the optical module transmits an optical signal indicating some conditions of the optical module, the light conducting structure 3 conducts the optical signal transmitted from the light source 4 to the outside of the optical module housing 1, such that the maintainer can intuitively observe some conditions inside the optical module and further position an abnormal optical module according to some conditions inside the optical module.

Figure 18:
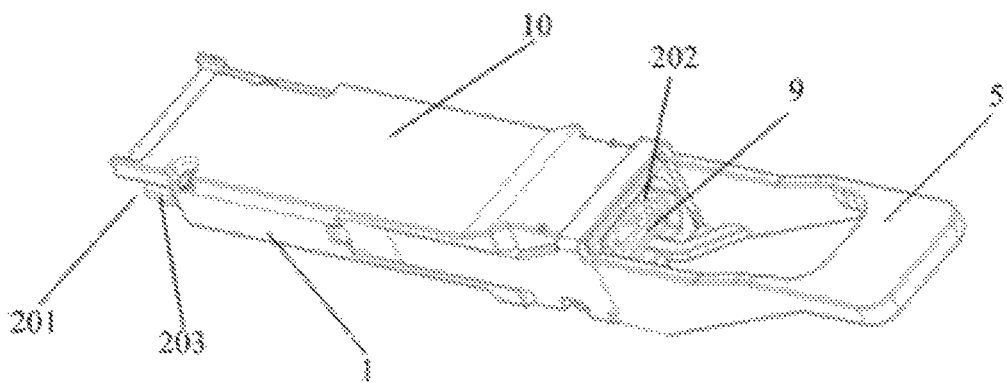
FIG. 18 is a schematic view of an external structure of an optical module provided by an embodiment of the present disclosure.

An embodiment of the present disclosure provides an optical module including a housing 1 (i.e., a lower housing 1), an upper housing 10, and a handle 5, as shown in FIG. 18.

The upper housing 10 and the lower housing 1 of the optical module form an open cavity with both ends opened, and this open cavity encloses internal parts of the optical module. The lower housing 1 of the optical module is a U-shaped groove, the upper housing 10 of the optical module is a cover plate, and the upper housing 10 and the lower housing 1 form the cavity with both ends opened. A portion of the light conducting structure 3 is located inside the cavity, and another portion of the light conducting structure 3 is located outside the cavity. One end of the cavity is an electrical interface 201 of the optical module and the other end of the cavity is an optical interface 202 of the optical module. The cavity is used not only to enclose and protect the internal parts of the optical module, but also to form the electromagnetic isolation.

When the optical module is connected to the system end, the electrical interface 201 and the body of the optical module are inserted into the system end, and the optical interface 202 of the optical module is exposed to the outside of the system end, facilitating the connection with an optical fiber. The electrical interface 201 of the optical module includes an electrical connector 203. The electrical conduction between the optical module and the system end is realized by inserting the electrical connector 203 into an interface reserved by the system end. The common electrical connector is a golden finger. The optical interface 202 of the optical module is an optical transmission interface between the optical module and the optical fiber. To realize the optical connection between the optical fiber and the optical interface, a standard optical fiber adapter 9 is used to connect the optical module with the optical fiber in the industry. One end of the optical fiber adapter 9 is plugged into the external optical fiber and the other end is inserted into the optical interface of the optical module. The optical fiber adapter can be stuffed into the optical interface of the optical module. The common optical fiber adapters include MT plugs.

Figure 9:
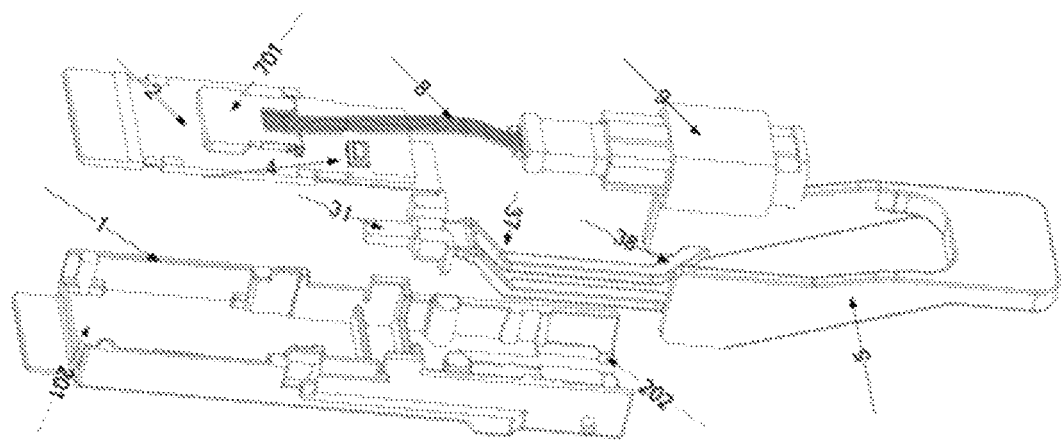
Figure 10:
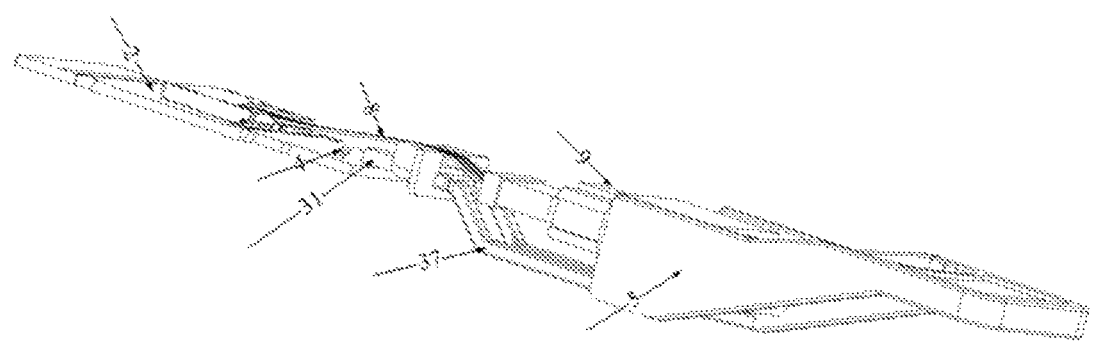
Figure 11:
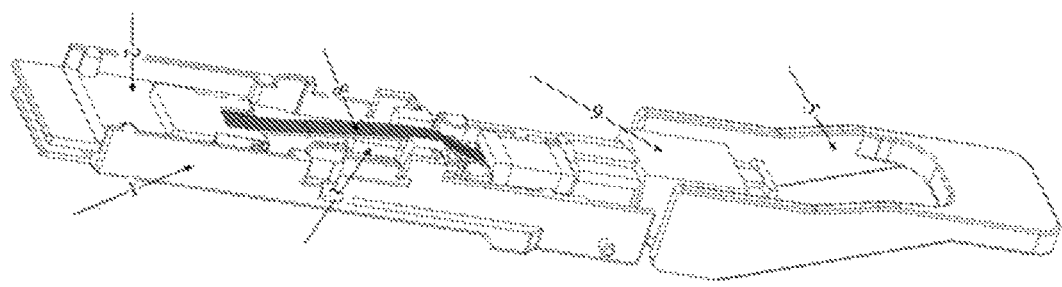

In the general design of the optical module, the circuit board is mounted on the lower housing of the optical module; one end of an optical fiber ribbon is connected to the circuit board and the other end is connected to the optical fiber adapter, the optical fiber adapter is located in the cavity formed by the upper housing and the lower housing and stuffed into the optical interface. In the embodiment of the present disclosure, the position where the light conducting structure 3 is mounted corresponds to the position where the optical fiber ribbon and the optical fiber adapter (e.g., LC optical fiber adapter) connected to the optical fiber ribbon are mounted, as shown in FIGS. 9 to 11. For not changing the above-mentioned mounting positions of the optical fiber ribbon and the optical fiber adapter in the optical module housing 1, the shape of the light conducting structure 3 in the present disclosure is designed so as to mount the light conducting structure 3 to the bottom of the housing 1 without changing the dimension of the optical module housing, as described follows.

Figure 7:
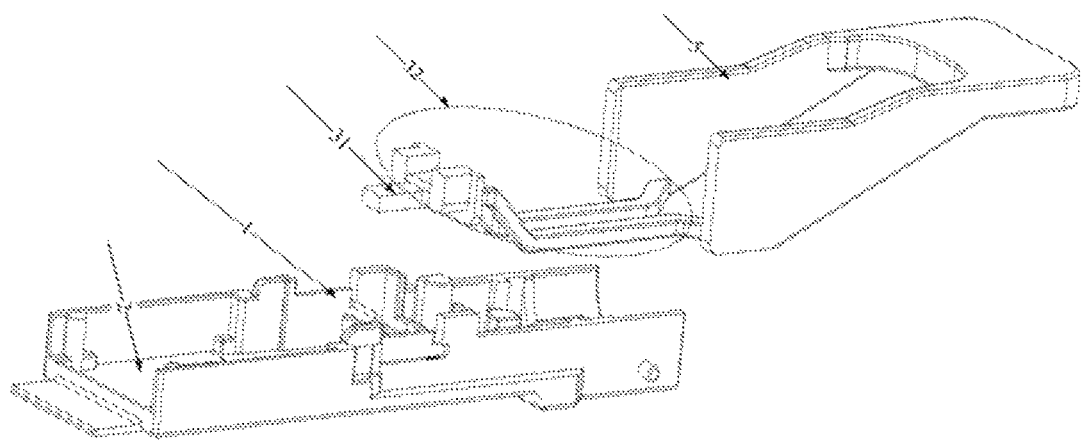

In an embodiment of the present disclosure, the light conducting structure 3 includes a light receiving portion 31 and a light conducting portion 32, referring to FIG. 1 and FIG. 7.

Figure 5:
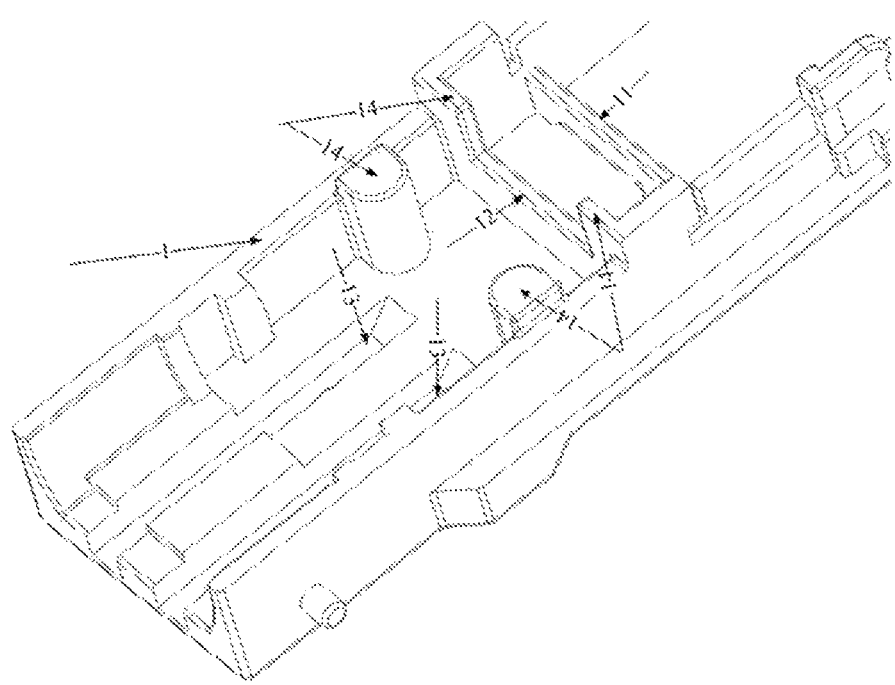
Figure 6:
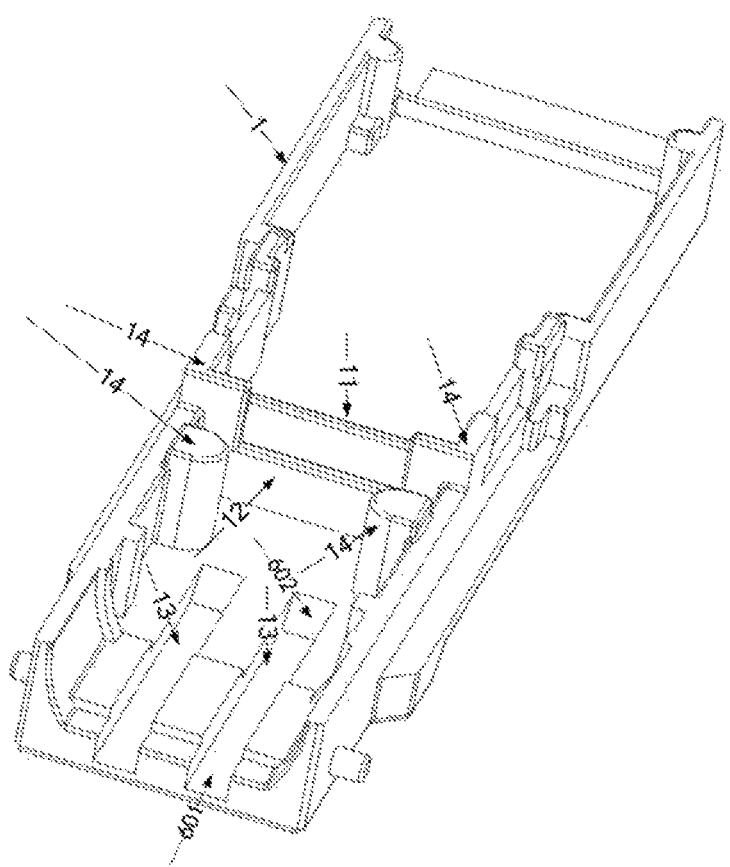

The light receiving portion 31 may have a clamping portion, and the optical module housing 1 may have a clamping fitting portion, and the light receiving portion 31 may be fixed to the housing 1 of the optical module by the combination of the clamping portion with the clamping fitting portion. According to an embodiment of the present disclosure, the light receiving portion 31 is laid on a first supporting frame 11 (as shown in FIG. 5 and FIG. 6) at the bottom of the housing 1, as shown in FIG. 5. A portion of the light receiving portion 31 may also be laid on the circuit board 2. The light receiving portion 31 is configured to receive the optical signal transmitted from the light source 4, and the light receiving portion 31 is disposed close to the edge of the circuit board 2 (as shown in FIG. 1), so that the light receiving portion 31 can receive an optical signal having more energy. The shape of the receiving portion 31 is not particularly limited in embodiments of the present disclosure, and may be square cylindrical (such as the light receiving portion 31 shown in FIG. 3), or may be cylindrical or other shapes.

The light conducting portion 32 is a structure on the light guiding structure 3 other than the light receiving portion 31, and is configured to transmit the optical signal received by the light receiving portion 31 to the outside of the housing 1.

Figure 3:
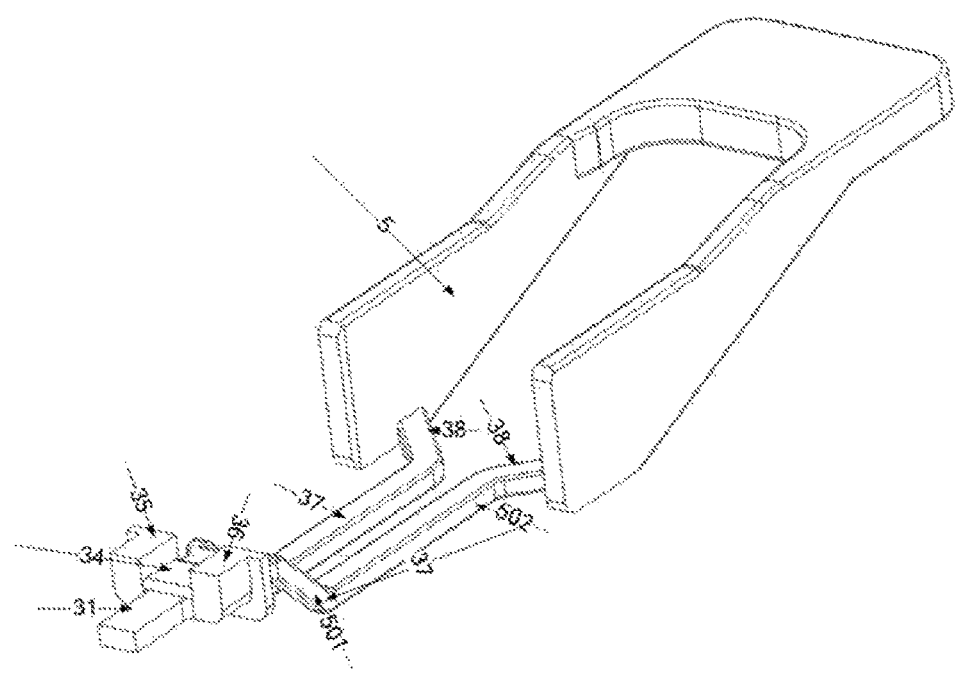
Figure 4:
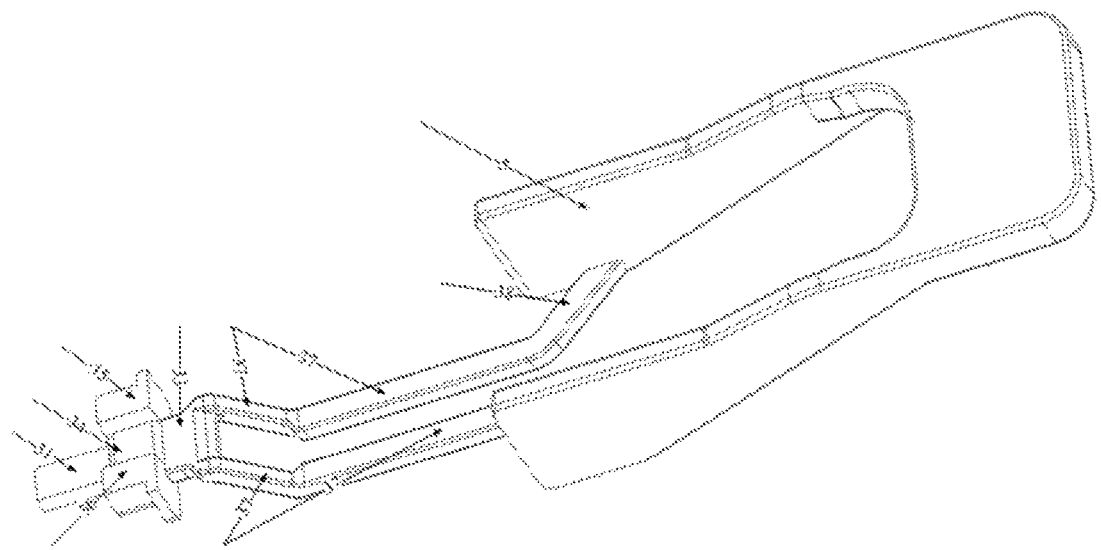

In an embodiment of the present disclosure, as shown in FIG. 3 and FIG. 4, the light conducting portion 32 may include a light guiding post 33 bent at both ends. A first bending portion 37 of the light guiding post 33 is disposed inside the housing and the first bending portion 37 is first bent obliquely toward the bottom of the housing 1 and then bent horizontally along the bottom of the housing 1. A second bending portion 38 of the light guiding post 33 is disposed outside the housing 1 and the second bending portion 38 is bent toward the lateral direction of the housing 1. The bending directions of the first bending portion 37 and the second bending portion 38 can be seen from FIGS. 3 and 4. The shape of the light guiding post 33 in the light conducting portion 32 is designed in a double-bent shape, in such a way not only the light conducting structure 3 can be compactly mounted to the bottom of the housing 1 without changing the mounting positions of the optical fiber ribbon and the optical fiber adapter in the optical module housing 1 and without changing the dimension of the optical module housing 1, but also the double-bent structure of the light guiding post 33 allows that when the optical signal received by the light receiving portion 31 transmits to the first bending portion 37 and the second bending portion 38, a total reflection will occur at the bend, thereby changing the propagation direction of the optical signal in the light guiding post 33 and conducting the optical signal to a specified position outside the housing 1.

In an embodiment of the present disclosure, as shown in FIG. 3, the first bending portion 37 may include a first connecting portion 501 and a second connecting portion 502. The first connecting portion 501 is a portion of the first bending portion 37 which is bent obliquely toward the bottom of the housing 1, the second connecting portion 502 is a portion of the first bending portion 37 which is bent horizontally along the bottom of the housing 1. One end of the first connecting portion 501 is connected to a connecting component 34 and the other end thereof is connected to one end of the second connecting portion 502. One end of the second connecting portion 502 is connected to the other end of the first connecting portion 501, and the other end of the second connecting portion 502 is connected to the second bending portion 38. The first connecting portion 501 and the second connecting portion 502 are not parallel to each other; that is to say, the included angle thereof is greater than 0° and smaller than 180°. The second connecting portion 502 may form a rail structure similar to that of a railway track, and the handle 5 is U-shaped. The rail structure of the second connecting portion is connected to the side of the U-shaped handle via the second bending portion 38, as shown in FIG. 4. The second connecting portion 502 forms the rail structure, thereby saving a space occupied by the light conducting structure. It will be appreciated that the first bending portion may also be arc-shaped.

Figure 2:
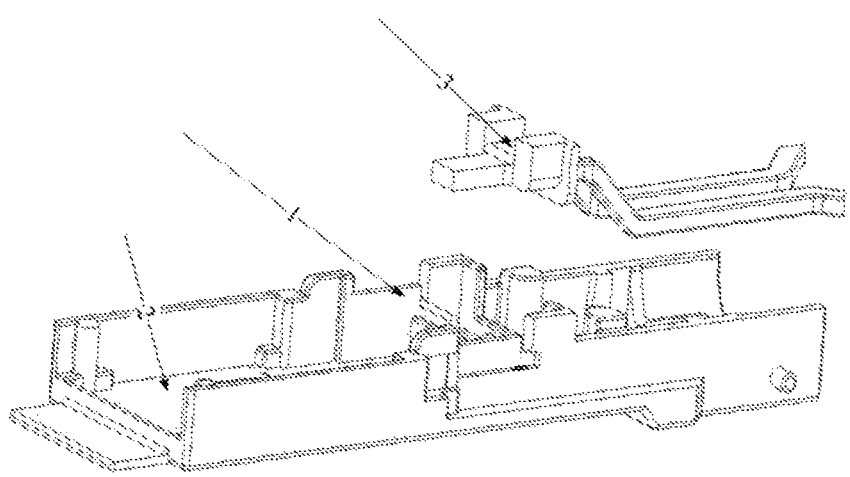

In a general design, the optical fiber adapter should be stuffed into the optical interface of the optical module; while in the present disclosure, the light conducting structure in the optical module needs to be connected to the handle which is located outside the optical module through the optical interface, thus avoiding the optical fiber adapter spatially should be taken into consideration for the design of the light conducting structure. FIG. 2 is a schematic view showing a relative position relation between the light conducting structure 3 and the housing 1 of FIG. 1 when being mounted. In order to realize the fitting of the light conducting structure 3 with the bottom of the housing 1, the shape of the bottom of the housing should be designed to match with the shape of the light conducting structure 3.

In an embodiment of the present disclosure, the shape of the bottom of the optical module housing 1 is determined by the shape of the light guiding post 33 having both ends bent. As shown in FIGS. 5 and 6, a guiding groove 13, which is formed at the bottom of the housing 1, is aligned with the first bending portion 37, and the bending direction of the guiding groove 13 coincides with that of the first bending portion 37, that is, bending obliquely toward the bottom of the housing 1 and then bending horizontally along the bottom of the housing 1, so that the first bending portion 37 can be fitted with the guiding groove 13. Where the guiding groove 13 may include a groove 601 and a wedge-shaped end-surface 602 close to a second supporting frame 12. The second connecting portion 502 of the first bending portion 37 may be located in the groove 601 such that the light guiding structure 3 can spatially avoid the optical fiber adapter through the groove 601. The first connecting portion 501 and the second connecting portion 502 forms an included angle, the angle of which is the same as the inclination angle of the wedge-shaped end-surface 602, so that the connection between the first connecting portion and the second connecting portion can smoothly abut the lower housing.

The quantity of the first bending portion 37 and the quantity of the second bending portion 38 of the light guiding post 33 may be one or two. In an embodiment of the present disclosure, as shown in FIGS. 3 and 4, two first bending portions 37 and two second bending portions 38 of the light guiding post 33 are disposed. The light guiding post 33 is divided into two when bending obliquely toward the bottom of the housing 1. The first bending portions 37 of the two light guiding posts are disposed symmetrically, and the second bending portions 38 of the two light guiding posts are also disposed symmetrically. Correspondingly, two guiding grooves 13 are disposed at the bottom of the housing 1.

In an embodiment of the present disclosure, as shown in FIGS. 3 and 4, the light conducting portion 32 may further include a connecting component 34 configured to make the light receiving portion 31 be in communication with the first bending portion 37. The connecting component 34 is laid on the second supporting frame 12 at the bottom of the housing 1. As shown in FIG. 5, the first supporting frame 11 is in parallel with the second supporting frame 12, the first supporting frame 11 is configured to support the light receiving portion 31, and the U-shaped groove formed by the second supporting frame 12 and a plate-shaped side baffle is configured to fix the connecting component 34.

As shown in FIGS. 3 and 4, a first side baffle 35 and a second side baffle 36 are disposed on two sides of the connecting component 34, respectively, the first side baffle 35 and the second side baffle 36 are fitted with side baffles 14 on two sides of the housing 1, respectively, so as to fix the light conducting structure 3 to the bottom of the housing 1. As shown in FIGS. 5 and 6, two side baffles 14 are disposed on each side of the housing 1, one in a cylinder-shape and the other in a plate-shape, so that the first side baffle 35 and the second baffle 36 of the light conducting structure 3 can be locked between the cylinder-shaped side baffle 14 and the plate-shaped side baffle 14.

The optical signal transmitted from the light source 4 can be used to indicate the working state inside the optical module, and for the above optical module, the optical signal indicating the working state of the optical module is conducted from the inside of the optical module to the outside of the optical module housing through the light conducting structure 3, so that the optical signal transmitted from the light source 4 can be intuitively reflected on the external housing of the optical module. The maintainer can judge, through these optical signals, which optical module works abnormally and which area of the optical module has the abnormal working state, hereby quickly positioning the abnormal optical module and its abnormal area and then improving the positioning efficiency of the abnormal optical module.

Figure 8:
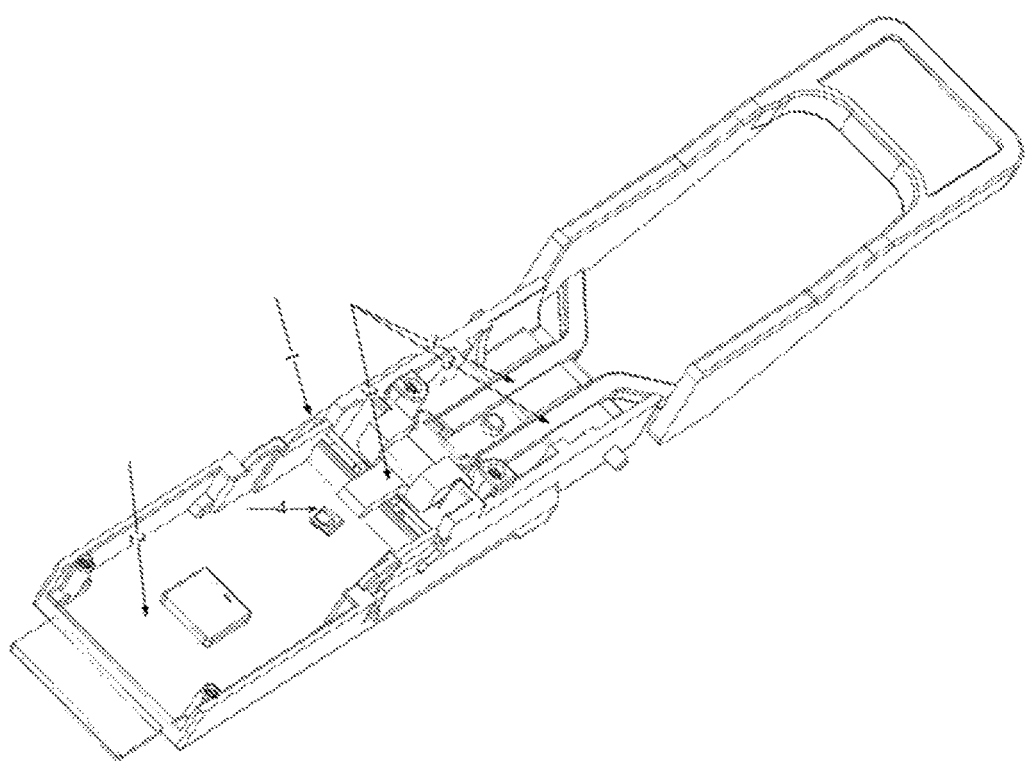

The light conducting structure described above may be applied to the optical modules with different profiles. In an embodiment of the present disclosure, the optical module as shown in FIGS. 7 and 8 includes the housing 1, the circuit board 2, the light conducting structure 3 and the handle 5. The light conducting structure 3 and the handle 5 may either integrally form a light conducting component or form an optical connecting component as a separate component. The light conducting structure 3 includes the light receiving portion 31 and the light conducting portion 32. The light conducting portion 32 includes a light guiding post 33, a connecting component 34, as well as the first side baffle 35 and the second side baffle 36 on two sides of the connecting component 34. The light guiding post 33 includes the first bending portion 37 and the second bending portion 38, the quantities of which are two, respectively, and two second bending portions 38 are in communication with the handle 5.

Herein, the content about the light source 4 is referred to the above-described embodiments, and will not be described here. The structures of the light receiving portion 31, the light conducting portion 32, the light guiding post 33, the connecting component 34, the first side baffle 35, the second side baffle 36, the first bending portion 37 and the second bending portion 38 of the light conducting structure 3 are described with reference to the above embodiments, and will not be described here. The fitting of the light conducting structure 3 with the housing 1 is described with reference to the above embodiments, and will not be described here. The handle 5 is located outside the cavity enclosed by the upper housing and lower housing. In the embodiment of the present disclosure, the handle of the optical module is reused and made of a transparent material, and can not only be used as a handle but also allow an optical signal transmitted by the light source to be intuitively reflected outside the housing of the optical module. It will be appreciated that embodiments of the present disclosure may also employ other structures or devices, not only limited to a handle, to conduct and display the light emitted from the light source outside the optical module as a visual indicating signal.

FIG. 7 is a schematic view before the light conducting structure 3 and the handle 5 are mounted on the housing 1, and FIG. 8 is a schematic view after the light conducting structure 3 and the handle 5 are mounted on the housing 1.

In the optical module as shown in FIGS. 7 and 8, the light receiving portion 31, the connecting component 34 and the first bending portion 37 of the light conducting structure 3 are located inside the optical module housing 1. The two second bending portions 38 of the light conducting structure 3 are located outside the housing 1. When the light source 4 inside the optical module 4 transmits the optical signal indicating some conditions of the optical module, the light conducting structure 3 conducts the optical signal transmitted from the light source 4 to the outside of the optical module housing 1, i.e., conducting the optical signal to the handle 5 via the second bending portion 38.

In order to enable the second bending portion 38 and the handle 5 to display the optical signal, the light conducting structure 3 and the handle 5 may be an integrally formed transparent light conducting component, such as transparent light conducting plastic. In this way, the maintainer can intuitively observe some conditions inside the optical module from the handle 5 and the second bending portion 38 and then position the abnormal optical module according to some conditions inside the optical module.

In the embodiments of the present disclosure, the mounting relation of the circuit board, the light conducting structure, the optical fiber ribbon, the optical fiber adapter, the handle and the optical module housing 1 can be seen with reference to FIGS. 9 to 11. The structures of the devices such as the optical fiber ribbon, the optical fiber adapter, etc. which are not the key points, are omitted in the description of the embodiments.

The mounting and corresponding relations among the circuit board 2, the optical fiber ribbon 8, the optical fiber adapter 9, the light conducting structure 3, the handle 5 and the housing 1 are illustrated in FIG. 9. During the mounting process of the above devices, the circuit board 2 and the light conducting structure 3 are mounted on the housing 1 first, and then the optical fiber ribbon 8 connected to the circuit board 2 and the optical fiber adapter 9 connected to the optical fiber ribbon 8 are laid above the light guiding structure 3.

As shown in FIG. 9, the optical module may further include a lens component 701. The housing 1 (i.e., the lower housing 1) is U-shaped and forms a half-wrapped space. The circuit board 2, the optical fiber ribbon 8, the optical fiber adapter 9 and the light conducting structure 3 are located inside the lower housing. The surface of the circuit board 2 in the optical module has the lens component 701 which forms a cavity with the circuit board 2, the cavity having a laser chip and/or a light detecting chip. The optical fiber ribbon 8 connects the lens component 701 with the optical fiber adapter 9 which is located inside the cavity formed by the upper housing and lower housing, i.e., inside the optical module. The optical fiber ribbon passes through the internal space of the optical module through the upper portion of the light conducting structure, and is connected to the optical fiber adapter. The optical fiber ribbon is inserted into the optical fiber adapter and formed an optical path outputting the light, and an optical conducting path is formed by the optical fiber outside the optical module and the optical path via the optical fiber adapter.

The optical fiber ribbon 8 passes through the light conducting structure via the connecting component 34, facilitating the space saving. The optical fiber adapter 9 is disposed in the lower housing 1 and located at the optical interface 202. The optical fiber ribbon 8 is connected into the optical fiber adapter 9 so that the optical fiber adapter 9 becomes the light output port of the optical module. At this point, the optical fiber adapter 9 and the light conducting portion 32 are located at the light output port of the optical module. In the general design, the optical interface 104 of the optical module is stuffed with the optical fiber adapter 9, and there is no space to place the light conducting portion. In order to be compatible with the existing optical module design, the present disclosure provides a guiding groove at the light output port of the lower housing 1, enabling the light conducting portion to be disposed at the optical interface via the guiding groove. Therefore, in terms of the overall configuration of the light conducting portion, the first connecting portion and the second connecting portion of the first bending portion are not parallel to each other; and in terms of the overall configuration of the optical module, the extension structure of the light conducting portion is declined.

The optical fiber adapter provided in the embodiments of the present disclosure may take many forms and is not limited to the forms presented in the accompanying drawings. The optical fiber adapter commonly used is the MT optical fiber adapter. The main purpose of the optical fiber adapter is to connect with the optical fiber outside the optical module. The present disclosure does not limit the optical fiber to exist inside the optical module, and also does not limit the optical fiber adapter to connect with the optical fiber inside the optical module. The optical connection can be applied between the optical fiber adapter and the inside of the optical module, such as the light emitted from a laser enters into the optical fiber adapter. When applying a transmitting optical sub-assembly (TOSA), a receiving optical sub-assembly (ROSA) or a bi-directional optical sub-assembly (BOSA) with TO package, the light incident end or light receiving end thereof is connected with the optical fiber outside the optical module. The transmitting optical sub-assembly (TOSA), the receiving optical sub-assembly (ROSA) or the bi-directional optical sub-assembly (BOSA) with TO package may be used as the optical fiber adapter mentioned in the present disclosure. The optical fiber adapter can be directly connected to the optical fiber, or can be connected to the optical fiber via an adapter such as an optical fiber adapter.

FIG. 10 shows the position relation between the devices of the circuit board 2, the optical fiber ribbon 8 and the optical fiber adapter 9, and the light conducting structure 3. A portion of the light receiving portion 31 of the light conducting structure 3 is laid on the circuit board 2 and close to the light source 4 on the edge of the circuit board 2. The optical fiber ribbon 8 is located above the connecting component 34 which is located between the light receiving portion 31 and the light conducting portion 32 of the light conducting structure 3, and the optical fiber adapter 9 is disposed above the light guiding post 33 of the light conducting structure 3.

FIG. 11 shows a schematic view of the devices, including the circuit board 2, the optical fiber ribbon 8, the optical fiber adapter 9, the light conducting structure 3 and the like after being mounted to the housing 1. The housing 1 of the optical module herein refers to a lower housing, and the optical module may further include an upper housing. The housing 1 includes a screw hole, and the upper housing (see the upper housing 10 shown in FIG. 14) can be fixed to the lower housing (housing 1) shown in FIG. 11 by a screw.

The optical signal transmitted from the light source 4 can be used to indicate the working state inside the optical module. For the optical modules shown in FIGS. 7 to 11, the optical signal indicating the working state of the optical module can be conducted from the inside of the optical module to the handle 5 of the optical module via the light conducting structure 3, so that optical signal transmitted from the light source 4 can be intuitively reflected outside the housing of the optical module. According to these optical signals, the maintainer can determine which optical module works abnormally and which area of the optical module has the abnormal working state, hereby quickly positioning the abnormal optical module and its abnormal area and then improving the positioning efficiency of the abnormal optical module.

Figure 12:
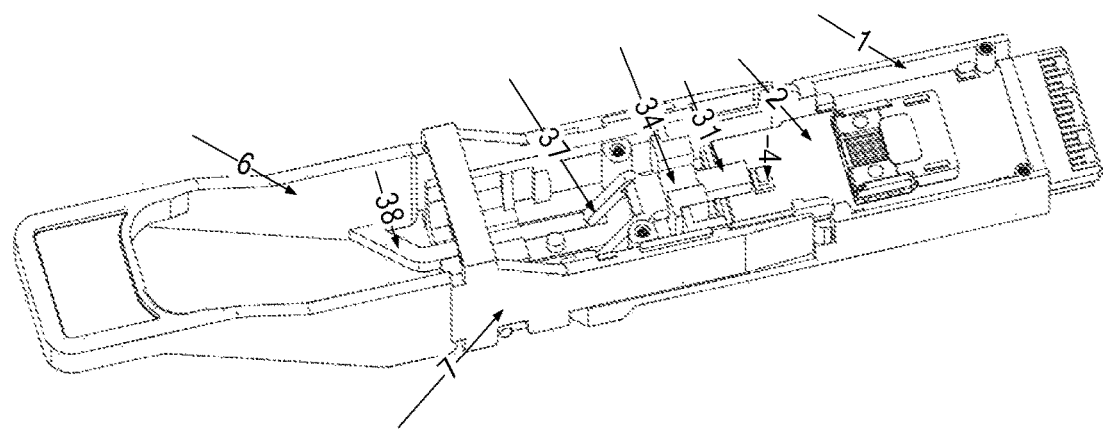
Figure 13:
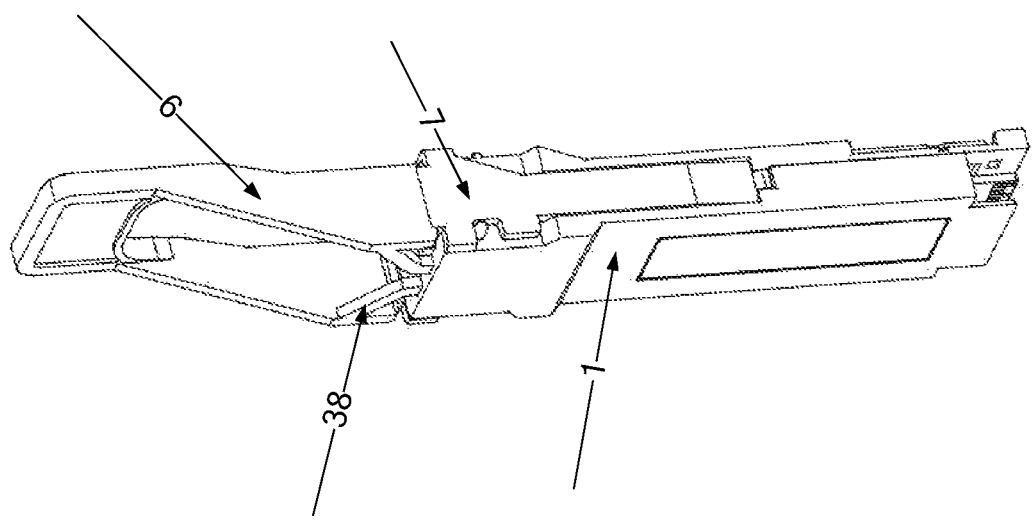
Figure 14:
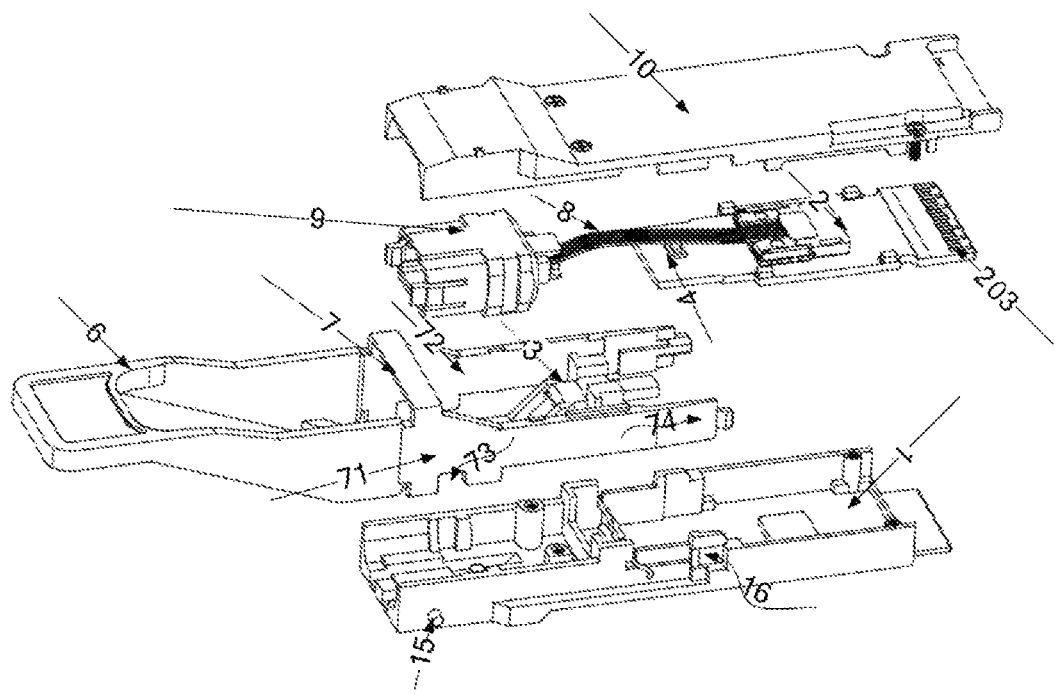

According to an embodiment of the present disclosure, the light conducting structure 3 described above may also be applied to an optical module with an unlocking handle, as shown in FIGS. 12 to 14. The mentioned optical module mainly comprises the housing 1, the circuit board 2, the light conducting structure 3, an unlocking handle 6, and an unlocking device 7 assembled with the unlocking handle 6, where the light guiding structure 3 and the unlocking handle 6 form an integrated structure.

The light conducting structure 3 includes the light receiving portion 31 and the light conducting portion 32. The light conducting portion 32 includes the light guiding post 33, the connecting component 34, as well as the first side baffle 35 and the second side baffle 36 on two sides of the connecting component 34. The light guiding post 33 includes the first bending portion 37 and the second bending portion 38, the quantities of which are two, respectively, and two second bending portions 38 are in communication with the unlocking handle 6.

Herein, the content about the light source 4 are referred to the above-described embodiments, and will not be described here. The structures of the light receiving portion 31, the light conducting portion 32, the light guiding post 33, the connecting component 34, the first side baffle 35, the second side baffle 36, the first bending portion 37 and the second bending portion 38 of the light conducting structure 3 are described with reference to the above embodiments, and will not be described here. The fitting and mounting of the light conducting structure 3 with the housing 1 are described with reference to the above embodiments, and will not be described here.

In the optical module as shown in FIGS. 12 and 14, the light receiving portion 31, the connecting component 34 and the first bending portion 37 of the light conducting structure 3 are located inside the optical module housing 1. The two second bending portions 38 of the light conducting structure 3 are located outside the housing 1. When the light source 4 inside the optical module 4 transmits the optical signal indicating some conditions of the optical module, the light conducting structure 3 conducts the optical signal transmitted from the light source 4 to the outside of the optical module housing 1, i.e., conducting the optical signal to the unlocking handle 6 via the second bending portion 38.

In order to enable the second bending portion 38 and the unlocking handle 6 to display the optical signal, the light conducting structure 3 and the unlocking handle 6 may be an integrally formed transparent light conducting component, such as transparent light conducting plastic. In this way, the maintainer can intuitively observe some conditions inside the optical module from the unlocking handle 6 and the second bending portion 38 and then position the abnormal optical module according to some conditions inside the optical module.

In the embodiment of the present disclosure, the mounting relation of the circuit board, the light conducting structure, the unlocking handle 6, the unlocking device 7, the optical fiber ribbon, the optical fiber adapter, and the optical module housing 1 can be seen with reference to FIGS. 12 to 14. The structures of the devices such as the optical fiber ribbon, the optical fiber adapter, etc. which are not the key points, are omitted in the description of the embodiments.

The mounting position relation among the circuit board 2, the light conducting structure 3, the unlocking handle 6, the unlocking device 7 and the optical module housing 1 will be described with reference to FIGS. 12 to 14.

FIG. 12 is a front view of the circuit board 2, the light conducting structure 3, the unlocking handle 6 and the unlocking device 7 after being mounted to the housing 1. It can be seen from FIG. 12 that the circuit board 2 is mounted inside the housing 1; most portions of the light conducting structure 3 are mounted inside the housing 1; the two second bending portions 38 of the light conducting structure 3 are connected to the unlocking handle 6 outside the housing 1; the unlocking handle 6 is fittingly mounted with the unlocking device 7; and the side surface of the unlocking device 7 is fitted with the side surface of the housing 1.

FIG. 13 is a rear view of the circuit board 2, the light conducting structure 3, the unlocking handle 6, and the unlocking device 7 after being mounted to the housing 1. As can be seen from FIG. 13, the two second bending portions 38 of the light guiding post 33 jut out to the outside of the housing 1 and are in communication with the unlocking handle 6, the unlocking device 7 is fitted with the unlocking handle 6, and the side surface of the unlocking device 7 is fitted with the side surface of the housing 1 as well.

FIG. 14 is a schematic view before the upper housing 10, the unlocking handle 6, the light conducting structure 3, the unlocking device 7, the circuit board 2, the optical fiber ribbon 8 and the optical fiber adapter 9 are mounted to the optical module housing 1.

The circuit board 2 and the light conducting structure 3 are mounted on the housing 1, and the optical fiber ribbon 8 and the optical fiber adapter 9 connected to the optical fiber ribbon 8 are laid above the light conducting structure 3. In terms of the position relation among the optical fiber ribbon 8, the optical fiber adapter 9 and the light conducting structure 3, the optical fiber ribbon 8 is located above the connecting component 34 between the light receiving portion 31 and the light conducting portion 32 of the light guiding structure 3, i.e., the optical fiber ribbon 8 is connected to the optical fiber adapter 9 by passing through the U-shaped structure formed by the connecting component 34, the first side baffle 35 and the second side baffle 36; and the optical fiber adapter 9 is disposed above the light guiding post 33 of the light conducting structure 3.

In terms of the fittingly connection of the unlocking device 7 and the housing 1, the unlocking device 7 is fitted with the side surface of the housing 1 by a first clamping portion 71 and a second clamping portion 72. The first clamping portion 71 and the second clamping portion 72 may be provided with positioning grooves 73 respectively, and the two side surfaces of the housing 1 are provided with positioning bosses 15. When the unlocking device 7 is fittingly connected with the housing 1, the positioning bosses 15 are located in the positioning grooves 73. The schematic view after assembling is shown in FIG. 12. The first clamping portion 71 and the second clamping portion 72 are provided with elastic clamping tongues 74, respectively, and clamping grooves 16 are provided on the two side surfaces of the housing 1. When the unlocking device 7 is fittingly connected with the housing 1, the elastic clamping tongues 74 are locked in the corresponding clamping groove a16.

The housing 1 of the optical module herein refers to a lower housing, and the optical module may further include the upper housing 10. As shown in FIG. 14, the housing 1 includes a positioning screw hole, and the upper housing 10 can be fixed to the lower housing shown in FIG. 14 by a screw.

The optical signal transmitted from the light source 4 can be used to indicate the working state inside the optical module. For the optical module shown in FIGS. 12 to 14, the optical signal indicating the working state of the optical module can be conducted from the inside of the optical module to the unlocking handle 6 of the optical module via the light conducting structure 3, so that optical signal transmitted from the light source 4 can be intuitively reflected outside the housing of the optical module. According to these optical signals, the maintainer can determine which optical module works abnormally and which area of the optical module has the abnormal working state, hereby quickly positioning the abnormal optical module and its abnormal area and then improving the positioning efficiency of the abnormal optical module.

The optical signal transmitted from the light source 4 can be used to indicate some conditions inside the optical module, such as the working state of the optical module or the working environment condition of the optical module. It should be noted that in the embodiment of the present disclosure, the optical signal transmitted from the light source 4 may be used to indicate any condition of the optical module, including but not limited to the working state of the optical module.

In an embodiment of the present disclosure, the optical signal transmitted from the light source 4 may be used to indicate the working state of the optical module.

The working state of the optical module includes normal or abnormal states of a working voltage, a working temperature, a transmitting optical power, a receiving optical power, and the like of the optical module.

The working state of the optical module can be controlled by the controller. The controller monitors the working state of the optical module in real time and transmits the control signal to the light source, the control signal may indicate the normal working state of the optical module, and may also indicate the abnormal working state of the optical module. The light source can emit different light to indicate different working states of the optical module according to the control signal transmitted from the controller. Where the controller can be disposed inside the optical module, and can also be disposed outside the optical module.

When the states of the working voltage, the working temperature, the transmitting optical power, the receiving optical power and the like of the optical module are abnormal, i.e., monitoring values are beyond a normal range, the controller can transmit a control signal to the light source 4, enabling the light source 4 to transmit an optical signal indicating the abnormal working state of the optical module according to the received control signal. Through the light conducting structure 3 in the optical module described above, the optical signal indicating the abnormal working state of the optical module can be conducted to the second bending portion and the handle or the unlocking handle 6 of the optical module from the inside of the optical module, so as to realize the abnormal state of the optical module being intuitively displayed outside the optical module and realize fast positioning of the abnormal working state of the optical module, hereby improving the detection efficiency of positioning abnormal optical module.

Of course, the controller may also send a control signal to the light source 4 when the optical module is in the normal working state, enabling the light source 4 to transmit an optical signal indicating the normal working state of the optical module according to the received control signal. Through the light conducting structure 3 in the optical module described above, the optical signal indicating the normal working state of the optical module can be conducted from the inside of the optical module to the second bending portion and the handle or the unlocking handle 6 of the optical module, so as to realize the normal state of the optical module being intuitively displayed outside the optical module and enable the optical module maintainer to immediately learn that the optical module is in the normal working state according to the observed optical signal.

In the optical module described above, the controller for transmitting the control signal to the light source 4 may be a micro control unit (MCU) inside the optical module, and may also be an MCU disposed outside the optical module, and is mainly configured to monitor the working state of the optical module and transmit the control signal to the light source 4.

The embodiments of the present disclosure illustratively provide two implementations for realizing the transmission of the control signal to the light source 4.

According to an embodiment of the present disclosure, the circuit board is provided with an internal controller, which is connected to the light source 4 through a signal line. The internal controller is configured to transmit a control signal to the light source, and the light source is configured to receive the control signal transmitted by the internal control and transmit an optical signal according to the control signal. The circuit board is provided with a register configured to store working state information of the optical module; the internal controller is configured to read the working state information of the optical module stored in the register and detect whether there is abnormal information in the working state information of the optical module. If yes, the internal controller transmits a control signal indicating an abnormal position of the optical module to the light source; if not, the internal controller transmits a control signal indicating that the optical module works normally to the light source.

Figure 15:
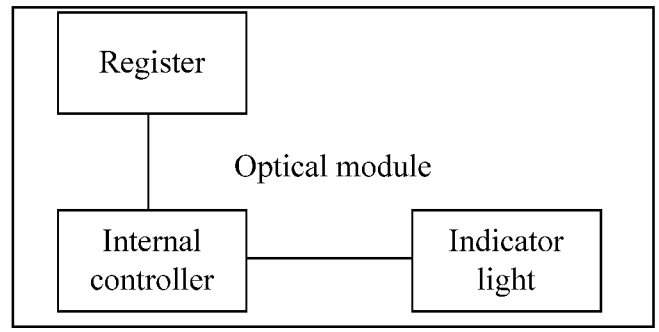
FIG. 15 to FIG. 16 are schematic views of two implementations of transmitting an indicator light control signal to an indicator light provided by embodiments of the present disclosure.

In an embodiment of the present disclosure, the light source may be an indicator light. As shown in FIG. 15, the register, the internal controller, and the indicator light are provided on the circuit board within the optical module, where the internal controller is connected to the register through a bus interface I2C, and the internal controller is connected to the indicator light through the signal line. The register is configured to store each piece of the working state information of the optical module in real time, such as monitored data of the working voltage, the working temperature, the transmitting optical power, the receiving optical power and other states of the optical module. The internal controller is configured to read the working state information of the optical module stored in the register through the bus interface I2C and detect whether or not there is abnormal information in the working state information of the optical module. If yes, the internal controller transmits an indicator light control signal indicating the abnormal position of the optical module according to the abnormal information, so that the indicator light can transmit an optical signal indicating the working state of the optical module. The indicator light is configured to transmit the corresponding optical signal according to the indicator light control signal transmitted from the internal controller.

According to an embodiment of the present disclosure, the circuit board is provided with a control pin connected to the light source; and the light source is configured to receive a control signal transmitted by an external controller and transmit an optical signal according to the control signal, where the external controller is disposed outside the optical module and configured to monitor the working state of the optical module and transmit a control signal indicating the working state of the optical module to the light source according to the working state of the optical module. The circuit board is provided with a register configured to store working state information of the optical module. The external controller is configured to read the working state information of the optical module stored in the register and detect whether or not there is abnormal information in the working state information of the optical module. If yes, the external controller transmits a control signal indicating an abnormal position of the optical module to the light source; if not, the external controller transmits a control signal indicating that the optical module works normally to the light source.

Figure 16:
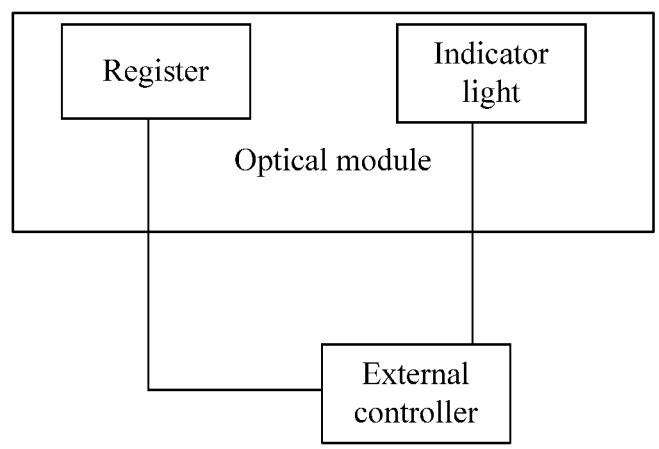

In an embodiment of the present disclosure, the light source may be an indicator light. As shown in FIG. 16, the register and the indicator light are disposed on the circuit board of the optical module, where the control pin is connected to the indicator light and the external controller is located outside the optical module. The external controller can read and monitor the stored data in the register, and transmit the indicator light control signal indicating the abnormal position of the optical module to the control pin through a golden finger of the optical module. The register is configured to store the working state information of the optical module, such as monitored data of the working voltage, the working temperature, the transmitting optical power, the receiving optical power and other states of the optical module. The external controller is configured to read the working state information of the optical module stored in the register on the circuit board 2 of the optical module, and detect whether or not there is abnormal information in the working state information of the optical module. If yes, the external controller transmits an indicator light control signal indicating the abnormal position of the optical module to the control pin. The indicator light is configured to receive the indicator light control signal through the control pin and transmit a corresponding optical signal according to the indicator light control signal.

In terms of the above-mentioned implementations for realizing the transmission of the control signal to the light source 4, the internal controller or the external controller may detect whether or not there is abnormal information in the working state information of the optical module, including: determining, according to the working state information of the optical module and a preset threshold, whether the working state of the optical module is abnormal. If it is detected that the monitored values of the working voltage, temperature, transmitting optical power, receiving optical power and the like of the optical module are within a normal range, then the working state of the optical module is normal, and the indicator light transmits a first optical signal. If it is detected that the monitored values of the working voltage, temperature, transmitting optical power, receiving optical power and the like of the optical module are beyond the normal range, then the indicator light transmits a second optical signal. For the different abnormal positions of the optical module, the second optical signals transmitted by the indicator light are different.

There may be a plurality of set thresholds, for example, when the working temperature of the optical module exceeds a first threshold, the frequency at which the second optical signal is transmitted is a first set value; when the working temperature of the optical module exceeds a second threshold, the frequency at which the second optical signal is transmitted is a second set value, where the second set value and the first set value are set such as to be distinguished by the maintainer. As another example, if the transmitting optical power of the optical power exceeds a first threshold of the transmitting optical power, the indicator light emits violet light having a first brightness value; if the transmitting optical power of the optical power exceeds a second threshold of the transmitting optical power, the indicator light emits violet light having a second brightness value, where the second brightness value and the first brightness value are set such as to be distinguished by the maintainer.

In terms of the above-mentioned implementations for realizing the transmission of the control signal to the light source 4, the indicator light may be one or more. The number of the indicator lights provided on the circuit board in the embodiments of the present disclosure is not particularly limited. The above-mentioned indicator light is configured to: transmit the first optical signal according to the control signal when the working state of the optical module is normal; and transmit the second optical signal according to the control signal when the working state of the optical module is abnormal. For the different abnormal positions of the optical module, the second optical signals transmitted by the indicator light are different.

In an embodiment of the present disclosure, the indicator light of the optical module may be one. When the working state of the optical module is normal, the indicator light control signal is used to instruct the indicator light to transmit the first optical signal, where the first optical signal is a green optical signal transmitted by the indicator light. When the working state of the optical module is abnormal, the indicator light control signal is used to instruct the indicator light to transmit the second optical signal, where the second optical signal is a red optical signal transmitted by the indicator light. Where the frequencies of the second optical signals are different for different abnormal positions of the optical module. For example, if the working voltage of the optical module is abnormal, the frequency of the red light emitted from the indicator light is 1 Hz; if the working temperature of the optical module is abnormal, the frequency of the red light emitted from the indicator light is 2 Hz; if a bias current of the optical module is abnormal, the frequency of the red light emitted from the indicator light is 4 Hz; if the transmitting optical power of the optical module is abnormal, the frequency of the red light emitted from the indicator light is 8 Hz; and if the receiving optical power of the optical module is abnormal, the frequency of the red light emitted from the indicator light is 16 Hz.

In an embodiment of the present disclosure, there may be a plurality of indicator lights in the optical module. When it is detected that the working state of the optical module is normal, the indicator light control signal is used to instruct the part or all of the indicator lights to transmit the first optical signal, where the first optical signal is the green optical signal transmitted by the indicator light. When it is detected that the working state of the optical module is abnormal, the indicator light control signal is used to instruct the indicator lights to transmit a third optical signal, where the colors of the third optical signals are different for the different abnormal positions of the optical module. For example, if the working state of the optical module is normal, all the indicator lights will emit green light; if the working voltage of the optical module is abnormal, the indicator lights will emit red light; if the working temperature of the optical module is abnormal, the indicator lights will emit blue light; if the bias current of the optical module is abnormal, the indicator lights will emit yellow light; if the transmitting optical power of the optical module is abnormal, the indicator lights will emit violet light; and if the receiving optical power of the optical module is abnormal, the indicator lights will emit white light.

It should be noted that when the working state of the optical module is normal, the indicator light transmits the first optical signal; when the working states of the optical module, such as working voltage, temperature, transmitting optical power, receiving optical power, and the like, are abnormal, the indicator light transmits the second optical signal, where the second optical signals are different for the different abnormal positions of the optical module. The above-described examples are only for distinguishing the first optical signal and the second optical signal which are not specifically limited in the present disclosure. The present disclosure includes but is not limited to the above examples.

In the above optical module, the optical signal indicating the working state of the optical module is conducted from the inside of the optical module to the outside of the optical module through the light conducting structure 3, so that the optical signal transmitted from the indicator light can be intuitively reflected outside the structure of the optical module. The maintainer can learn which optical module works abnormally and which area of the optical module has the abnormal working state through these optical signals, hereby quickly positioning the abnormal optical module and its abnormal area and then improving the positioning efficiency of the abnormal optical module.

It should be noted that, in the embodiments of the present disclosure, the application scenarios of the light conducting structure 3 in the optical module can be extended to a variety of applications and its functions are not only limited to intuitively indicating the working state of the optical module, but also intuitively indicating other performance parameters of the optical module. For example, when the wavelength of the optical signal transmitted by the laser is detected to shift in a short-wavelength direction or in a long-wavelength direction, the light conducting structure 3 of the embodiments of the present disclosure can be used to intuitively display the optical signal indicating such abnormal state information of the optical module outside the optical module. The maintainer can learn which optical module works abnormally and which area of the optical module has the abnormal working state, hereby quickly positioning the abnormal optical module and its abnormal area and then improving the positioning efficiency of the abnormal optical module.

Although the preferred embodiments of the present disclosure have been described, those skilled in the art will be able to make other alterations and modifications to these embodiments once knowing the basic inventive concept. Therefore, it is intended that the appended claims should be interpreted as including the preferred embodiments and all the alterations and modifications that fall within the scope of the present disclosure.

It will be apparent to those skilled in the art that various alterations and modifications may be made to the present disclosure without departing from the spirit and scope of the present disclosure. Thus, it is intended that the present disclosure contains such alterations and modifications if such alterations and modifications are within the scope of the claims and equivalents thereof.

What is claimed is:

1. An optical module, comprising: a housing, a circuit board, and a light conducting structure;
    the circuit board is provided with a light source, and the light conducting structure is configured to conduct light emitted by the light source to an outside of the housing;
    wherein a bottom of the housing is provided with a guiding groove, an optical fiber adapter is laid above a part of the light conducting structure, and the part of the light conducting structure is located between the bottom of the housing and the optical fiber adapter via the guiding groove.

2. The optical module according to claim 1, wherein the light conducting structure comprises a light receiving portion and a light conducting portion;
    the light receiving portion is laid on a first supporting frame at a bottom of the housing and configured to receive an optical signal transmitted from the light source;
    the light conducting portion is configured to conduct the optical signal received by the light receiving portion to the outside of the housing.

3. The optical module according to claim 2, wherein the light conducting portion comprises a connecting component in communication with the light receiving portion, and the connecting component is laid on a second supporting frame at the bottom of the housing.

4. The optical module according to claim 3, wherein a first side baffle and a second side baffle are disposed at two sides of the connecting component, respectively, wherein the first side baffle and the second side baffle are fitted with side baffles at two sides of the housing, respectively, so as to fix the light conducting structure to the housing.

5. The optical module according to claim 4, further comprising: an optical fiber ribbon, wherein the optical fiber ribbon is connected to the optical fiber adapter by passing through a space formed by the connecting component, the first side baffle and the second side baffle.

6. The optical module according to claim 2, wherein the light conducting portion comprises a light guiding post; the light guiding post comprises a first bending portion that is first bent obliquely toward the bottom of the housing and then bent horizontally along the guiding groove provided in the bottom of the housing.

7. The optical module according to claim 6, wherein a bending direction of the guiding groove coincides with a bending direction of the first bending portion, so that the first bending portion is fitted with the guiding groove.

8. The optical module according to claim 7, wherein the guiding groove comprises a groove and a wedge-shaped end-surface, a portion of the first bending portion that is bent horizontally along the guiding groove is disposed in the groove, and an inclination angle of the wedge-shaped end-surface is the same as an angle formed by a portion of the first bending portion that is bent obliquely toward the bottom of the housing and the portion of the first bending portion that is bent horizontally along the guiding groove.

9. The optical module according to claim 6, wherein the light guiding post further comprises a second bending portion that is bent toward a lateral direction of the housing.

10. The optical module according to claim 6, wherein a quantity of the light guiding post is one.

11. The optical module according to claim 6, wherein a quantity of the light guiding post is two, wherein two light guiding posts are symmetrically disposed.

12. The optical module according to claim 1, wherein the optical module further comprises a handle mounted outside the housing, and the light conducting structure is in communication with the handle.

13. The optical module according to claim 1, wherein the optical module further comprises an unlocking handle, and the light conducting structure is in communication with the unlocking handle.

14. The optical module according to claim 1, wherein an internal controller is provided on the circuit board, and the internal controller is connected to the light source through a signal line;
the internal controller is configured to transmit a control signal to the light source; and
the light source is configured to receive the control signal transmitted by the internal controller and transmit an optical signal according to the control signal.

15. The optical module according to claim 14, wherein a register is provided on the circuit board;
the register is configured to store working state information of the optical module;
the internal controller is configured to: read the working state information of the optical module stored in the register, detect whether or not there is any abnormal information in the working state information of the optical module, and indicate an abnormal state according to the detection result.

16. The optical module according to claim 1, wherein a control pin connected to the light source is provided on the circuit board;
the light source is configured to receive a control signal transmitted by an external controller and transmit an optical signal according to the control signal, wherein the external controller is disposed outside the optical module and configured to monitor a working state of the optical module and transmit a control signal indicating the working state of the optical module to the light source according to the working state of the optical module.

17. The optical module according to claim 16, wherein a register is provided on the circuit board;
the register is configured to store working state information of the optical module;
the external controller is configured to: read the working state information of the optical module stored in the register, detect whether or not there is any abnormal information in the working state information of the optical module, and indicate an abnormal state according to the detection result.

18. The optical module according to claim 1, wherein a portion of the light conducting structure is disposed within the housing, and another portion of the light conducting structure juts out from the housing.

19. The optical module according to claim 1, wherein the light conducting structure is disposed within the housing, and the light conducted by the light conducting structure is visible from the outside of the housing.

20. The optical module according to claim 1, wherein the housing forms a cavity with both ends opened, the optical fiber adapter is located at an end of the cavity.

* * * * *